(12) United States Patent
Knol

(10) Patent No.: US 6,578,313 B1
(45) Date of Patent: Jun. 17, 2003

(54) FISHING LURE

(75) Inventor: John Knol, Parramatta (AU)

(73) Assignee: Knol's Lures PTY LTD (AU)

( * ) Notice: Subject to any disclaimer, the term of this patent is extended or adjusted under 35 U.S.C. 154(b) by 0 days.

(21) Appl. No.: 09/958,988

(22) PCT Filed: Apr. 18, 2000

(86) PCT No.: PCT/AU00/00334
§ 371 (c)(1),
(2), (4) Date: Oct. 17, 2001

(87) PCT Pub. No.: WO00/62606
PCT Pub. Date: Oct. 26, 2000

(30) Foreign Application Priority Data

Apr. 21, 1999 (AU) .............................................. PQ4246

(51) Int. Cl.[7] .............................................. A01K 85/00
(52) U.S. Cl. ......................................... 43/42.47; 43/42
(58) Field of Search .......................... 43/42.23, 42.47, 43/42.49, 44.8, 44.82, 42.45, 42.48, 42.44; D22/133

(56) References Cited

U.S. PATENT DOCUMENTS

| | | | | |
|---|---|---|---|---|
| 3,753,310 A | * | 8/1973 | Werner | 43/42.39 |
| 4,667,434 A | * | 5/1987 | Newell | 43/42.47 |
| 4,807,388 A | * | 2/1989 | Cribb | 43/42.22 |
| 5,119,581 A | | 6/1992 | Rudolph | |
| 5,168,652 A | | 12/1992 | Davis | |
| 5,446,991 A | | 9/1995 | Brackus | |
| 5,857,283 A | | 1/1999 | Perrick | |

* cited by examiner

*Primary Examiner*—Charles T. Jordan
*Assistant Examiner*—Bret Hayes
(74) *Attorney, Agent, or Firm*—Larson & Taylor, PLC

(57) ABSTRACT

A fishing lure is disclosed which comprises a body which has a first end which has an externally attached fishing hook positioned thereat. A second opposite end of the body has a thin plate projecting outwardly therefrom in the shape of a circular arc bib. The bib has a hole therein which is fitted with an omega clip and a split ring so that the omega clip is held loosely in position by the split ring. A fishing line can be attached to the split ring in use. The body has a center of buoyancy closer to the first end than the second end. The location of the center of buoyancy of the lure, the shape of the body and the way in which the line is fastened to the bib contribute to the oscillatory motion of the lure when it traverses through water.

13 Claims, 2 Drawing Sheets

FISHING LURE

FIELD OF THE INVENTION

The present invention relates to apparatus for luring and snaring fish. The invention will primarily be described with reference to its use in river, lake, dam and ocean fishing, but it should be remembered that the invention can have broader use in the capture of any other predatory aquatic species.

BACKGROUND ART

Fishing lures are known in the art and are generally shaped to resemble the features of a fish, with a bulbous or wider 'head' end and a narrower 'tail' end. The lure is fitted with both an attachment to a fishing line and with a fish hook or the like. The design shape of such lures is intended to deceive a predatory aquatic animal into believing that the lure is edible thereby snaring the larger fish with the hook.

Frequent problems occur with the use of such lures. The regular design shape does not aid accurate casting of the line, or improve the motion of the lure through the water. Lures often become snagged in underwater debris, reeds or seaweed and then remain entangled. The physical shape of the lure alone is often insufficient to deceive aquatic predators, who at different times are known to be more attracted to the vibratory movement of a fish in water.

U.S. Pat. No. 5,446,991 discloses floating lures of various shapes and centres of buoyancy with integral hooks which are prone to damage, bending or breakage, resulting in the possibility of the entire lure being rendered useless. The lures shown do not demonstrate oscillatory motion behaviour. U.S. Pat. No. 4,796,379 discloses a lure with a restricted "wobbling" motion resulting mainly from the force of water on the curved frontal section of a weighted lure when it is in forward motion. Little attention has been given in the art to changes to the standard design of fishing lures to overcome such difficulties with usage and performance.

SUMMARY OF THE INVENTION

In a first aspect the present invention provides a fishing lure arranged for fasteningly receiving a fishing line thereon including:

a body having a generally planar member protruding from an end of the body, the member including a hole therethrough;

a fastening for the fishing line including an omega clip having arms projecting out from and connected to either side of a U-shaped portion, the U-shaped portion extending through the hole for receiving an eyelet on a part thereof that protrudes on one side of the member, with the arms being located on the other side of the member to protrude there beyond, such that the protruding part on the one side and the arms on the other side are free to oscillate so that when the lure traverses through water, the lure is caused to oscillate.

In this case, it is the fastening itself which causes oscillation, hence the lure shape need not be modified or distorted to bring about oscillation. When the lure oscillates with, for example, a rapid action at the end of the taut fishing line, this simulates the vibratory movement of a fish in water and attracts the attention of predators.

Preferably the fishing line is fastenable to the eyelet, and preferably the eyelet in the form of a split ring.

The arrangement of omega clip and split ring provides the body of the lure with the ability to oscillate with a rapid action at the end of a taut fishing line, simulating the vibratory movement of a distressed fish in water. This is aimed at attracting the attention of predators.

Preferably the planar member is a thin plate which is formed in the shape of a circular arc, resembling a bib.

Preferably the body includes a first end and a second end at which the line is attached, and has:

(a) a centre of buoyancy that is closer to the first end than the second end; and/or (b) a body shape which additionally promotes said oscillation.

In a second aspect the present invention provides a fishing lure including a body having a first end adapted for the external attachment of a fishing hook thereto and a second opposite end having a generally planar member protruding beyond the second end, the member arranged for fasteningly receiving a fishing line thereon, wherein the body has a centre of buoyancy and a centre of mass closer to the first end than the second end, and is enlarged closer to the first end than the second end.

It has been observed that locating the centre of buoyancy toward the first (rear) end of the lure rather than the end where the fishing line attaches means that in the water, the unique location of the centre of buoyancy ensures that if the leading edge of the lure becomes snagged by underwater debris, the lure may rise reversibly upward in order to be freed from entanglement. Also, by attaching the hook externally at the more buoyant end, it is less likely to become snagged.

Preferably the enlargement of the body is in the form of a bulbous portion typically having a streamlined shape.

Preferably a plurality of sites are provided on the body, each for externally supporting a respective fishing hook or the like. Preferably each fishing hook is attached by means of an individual split ring to the site in the shape of an eyelet which is integrally formed with the body. Preferably the eyelets are located on the body at the first end and at a point intermediate the first and second ends.

Preferably the body is elongated and includes a central core containing a buoyant substance and a continuous outer skin. Preferably the core is hollow and the substance is air or a light gas. Such an aerodynamic shape leads to improvements in the casting distance and casting accuracy of the lure when travelling in air prior to entry into the water. Mid-flight tumbling of the lure is reduced, avoiding the tangling of the line with any fishing hook(s) attached to the lure itself.

Preferably the outer skin and the member are formed from a lightweight corrosion resistant material such as plastic.

Preferably the body is shaped such that it generally tapers from a narrower second end to a wider first end.

Preferably the lure of the first aspect has a shape and an attachment mechanism as defined in the second aspect.

BRIEF DESCRIPTION OF THE DRAWINGS

Notwithstanding any other forms which may fall within the scope of the present invention, preferred forms of the invention will now be described, by way of example only, with reference to the accompanying drawings in which.

MODES FOR CARRYING OUT THE INVENTION

Figure 1:
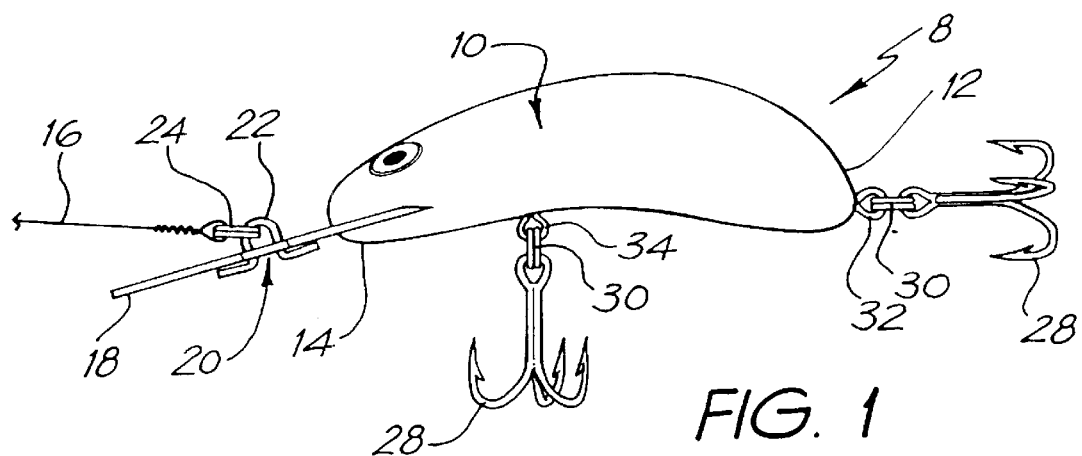
FIG. 1 shows a side elevation view of a fishing lure in accordance with the invention.
Figure 2:
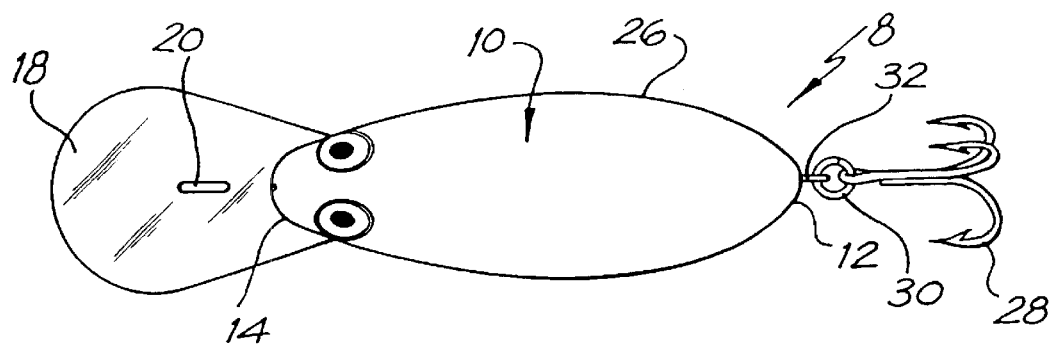
FIG. 2 shows a plan view of a fishing lure in accordance with the invention.
Figure 3:
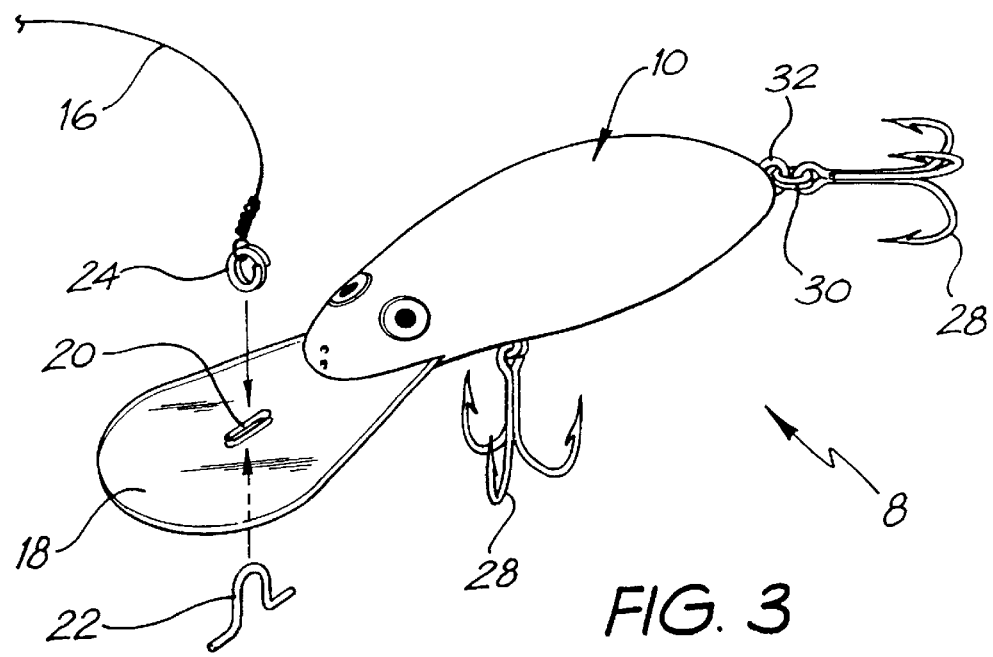
FIG. 3 shows a perspective view of a fishing lure in accordance with the invention.

Referring to the drawings, a lure 8 comprises a body 10 including a first end 12 adapted for the external attachment of a fishing hook, and a second opposite end 14 arranged for fasteningly receiving a fishing line 16 onto it. The body 10 is adapted (usually shaped) to have a centre of buoyancy closer to the first end 12 than the second end 14, indicated by a broadening of the shape of the lure body 10 toward the first end 12. However the orientation of the centre of buoyancy towards the first end can be achieved by other means, for example by using materials in the body of differing densities.

A thin plate in the shape of a circular arc bib 18 is attached to or incorporated within the second end 14 of the body 10. The bib 18 is adapted for fastening a fishing line 16 onto it and includes a hole 20 fitted with an omega clip 22 and a split ring 24 such that the omega clip 22 is held loosely in position by the split ring 24. As the lure 8 passes through the water, the loose nature of this method of fastening the fishing line 16 allows the body of the lure 8 to oscillate with a rapid action, simulating the vibratory movement of a fish in water which attracts the attention of predators. The shape and position of the centre of buoyancy of the lure 8 also assists this oscillatory motion. When the term oscillate is used it means that the lure vibrates in a motion between two points in a planar direction. The bib 18 provides the lure 8 with a superior cutting motion through the water, determining the depth which the lure can reach and assisting its oscillating action. Other means of loose fittings at bib 18 can be used to achieve similar results.

Figure 4:
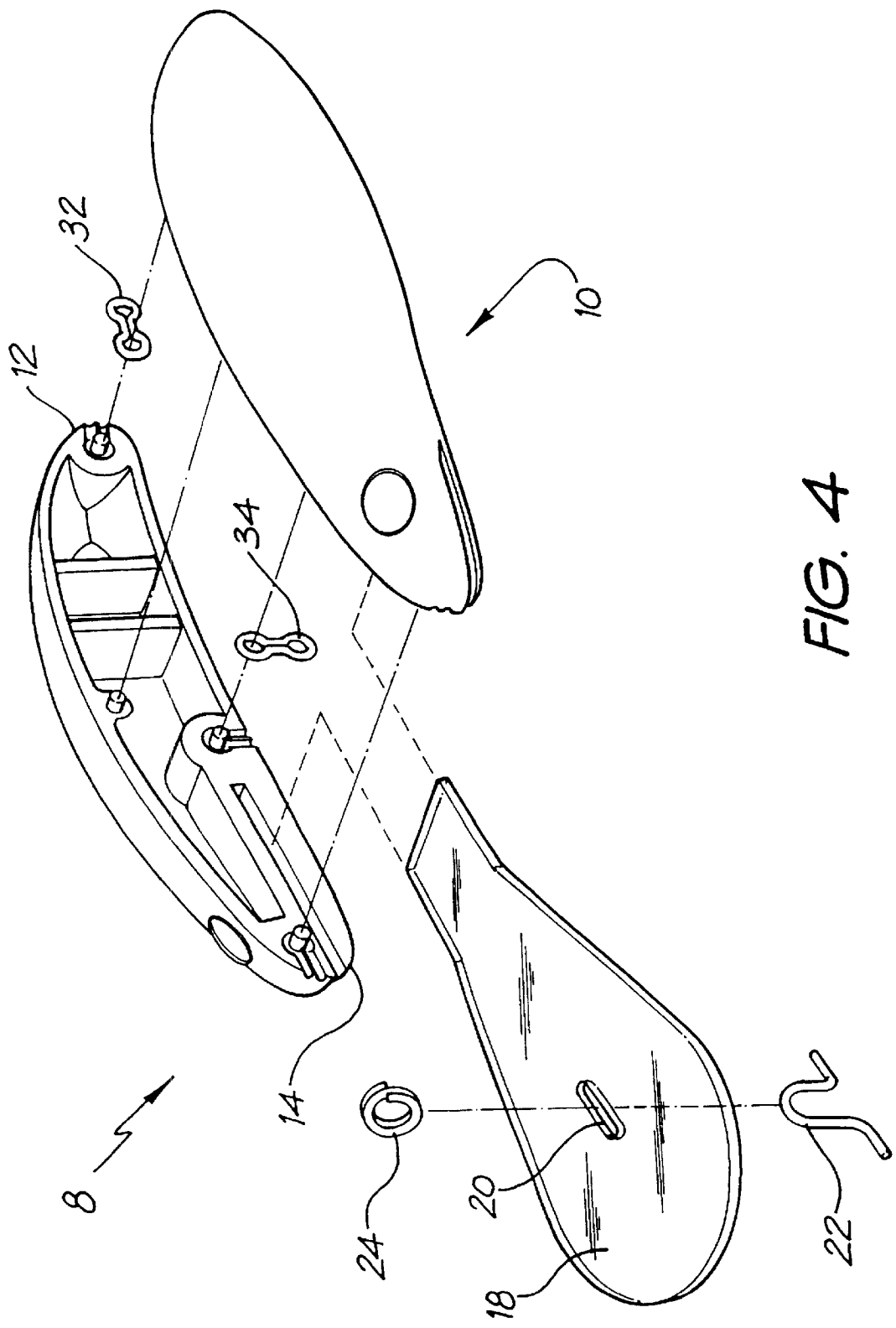
FIG. 4 shows a perspective exploded view of a fishing lure in accordance with the invention.

For example, rather than attach the split ring 24 (and thus the line 16) to omega clip 22 at the bib 18, it can be attached to oscillate at the second (front) end 14 of the lure. As shown in FIG. 4, eyelets 32 and 34 are respectively located at first end 12 and at the underside of the lure, intermediate the first and second ends. A similar eyelet can be positioned between the lure halves (at the formation shown in FIG. 4) at the second end 14, and the split ring 24 attached to that eyelet. Such an arrangement is typically employed for shallower travelling lures, whereas the bib/split ring attachment is typically used for deeper diving lures.

The lure body 10 itself is elongate in shape and includes a central core containing a buoyant substance such as air, other gases, polymeric foam or light plastic contained within a continuous outer skin 26. This outer skin 26 and the bib 18 are formed from a lightweight corrosion resistant material such as fibreglass, plastic and other synthetic materials or light metals such as aluminium. The outer skin 26 may feature colours, indicia or markings of prey fish to attract attention from predators.

The body 10 has a plurality of sites for supporting fishing hooks or the like (or for supporting the fishing line split ring at the second end as described above). Typically a fishing hook 28 is attached by means of a split ring 30 to each of eyelets 32 and 34 which are integrally formed to the body 10 in the manner shown in FIG. 4. One eyelet 32 is located at the first end 12, and another eyelet 34 can be located at a point intermediate the first end 12 and the second end 14 on the underbelly of the lure body 10. The use of externally mounted hooks 28 is advantageous to the life of the lure (in comparison to arrangements such as that disclosed in U.S. Pat. No. 5,446,991, where once such a hook becomes snagged and bent or broken, on debris in the water or in the mouth of a fish, for example, the entire lure is rendered useless). In the present invention the hooks 28 may be readily replaced if damaged, with no loss of the remainder of the lure itself.

Lure 8 is shaped with a narrow leading edge 14 tapering to a wider and heavier rear end 12, so that as the lure 8 is cast, it flies through the air with the heavier rear end 12 going first like a dart, by reason of its aerodynamic shape and weight distribution. This allows an improvement in the distance the lure 8 is able to be cast and the accuracy of its placement. Additionally, this aerodynamic shape and weight distribution ensures that the incidence of mid-flight tumbling of the lure 8 is reduced, thereby avoiding tangling of the line 16 with the hooks 28.

When the lure 8 enters the water, it is submerged and only floats as soon as its forward motion (which results from being towed behind a boat, or being retrieved (reeled in)) is stopped. In water the attitude of the lure is such that the rear end is up at an angle of approximately 30 degrees when viewed from the side. The unique location of its centre of buoyancy toward the rear end 12 of the lure ensures that when travelling through the water in this typical downward-angled orientation, if the lure 8 is snagged by underwater debris, reeds or seaweed and its directional motion slows, the inherent buoyancy of the larger end 12 of body 10 causes the lure 8 to float upwards and the flow of water across the upper surface of the lure results in the lure ascending in an upward and backward direction. This reversible upward rise to be freed from entanglement is termed an 'auto-reverse' action. The 'auto reverse' action ensures that debris is left behind and, able once again to travel through the water in a forward motion, the lure 8 continues to perform its designated task. Also, by mounting the major hook at that end, the hook is less likely to be snagged, as it is held up, relatively to the front of the lure.

Previously it has not been appreciated that changes to the design of fishing lures in order to mimic the vibratory action of a fish while simultaneously improving the motion dynamics of the lure itself can allow more accurate casting and better movement of a lure through air and water, giving improved performance and better fishing results.

Whilst the invention has been described with reference to a number of preferred embodiments it should be appreciated that the invention can be embodied in many other forms.

What is claimed is:

1. A buoyant fishing lure including a body having a first end adapted for the external attachment of a fishing hook thereto and a second opposite end having a generally planar member protruding beyond the second end, the member arranged for fasteningly receiving a fishing line thereon, wherein the body has a center of buoyancy and a center of mass closer to the first end than the second end.

2. A fishing lure as claimed in claim 1 wherein a plurality of sites are provided on the body, each for externally supporting a respective fishing hook.

3. A fishing lure as claimed in claim 2 wherein each fishing hook is attached by means of an individual split ring to the site in the shape of an eyelet which is integrally formed with the body.

4. A fishing lure as claimed in claim 3 wherein eyelets are located on the body at the first end and at a point intermediate the first and second ends.

5. A fishing lure as claimed in claim 1 wherein an outer skin of the lure and the member are formed from a lightweight corrosion resistant material.

6. A fishing lure as claimed in claim 1 wherein the body is shaped such that it generally tapers from a narrower second end to a wider first end.

7. A fishing lure as claimed in claim 1, wherein the lure is enlarged closer to the first end than the second end.

8. A fishing lure as claimed in claim 7, wherein the enlargement of the body is in the form of a bulbous portion.

9. A fishing lure as claimed in claim 1, wherein the planar member includes a hole therethrough, a fastening for the fishing line including an omega clip having arms projecting out from and connected to either side of a U-shaped portion, the U-shaped portion extending through the hole for receiving an eyelet on a part thereof that protrudes on one side of the member, with the arms being located on the other side of the member to protrude there beyond. such that the protruding part on the one side and the arms on the other side are free to oscillate so that when the lure traverses through water, the lure is caused to oscillate.

10. A fishing lure as claimed in claim 9 wherein the fishing line is fastenable to the eyelet.

11. A fishing lure as claimed in claim 9 wherein the eyelet is in the form of a split ring.

12. A fishing lure as claimed in claim 9 wherein the planar member is a thin plate which is formed in the shape of a circular arc, resembling a bib.

13. A fishing lure as claimed in claim 9, wherein the body has a shape that promotes oscillation.

* * * * *